United States Patent [19]

Berg et al.

[11] Patent Number: 4,820,345

[45] Date of Patent: Apr. 11, 1989

[54] WATER AND FIRE RESISTANT BUILDING MATERIAL

[75] Inventors: Johannes G. Berg, Hovik; Robert Smith-Johannsen, Borgheim, both of Norway

[73] Assignee: Norsk Proco AS, Oslo, Norway

[21] Appl. No.: 2,064

[22] Filed: Jan. 12, 1987

[30] Foreign Application Priority Data

Jan. 10, 1986 [NO] Norway .................................. 860066
Nov. 12, 1986 [NO] Norway .................................. 864501

[51] Int. Cl.$^4$ .............................................. C09D 5/16
[52] U.S. Cl. ............................. 106/18.12; 106/18.11; 106/105; 106/106; 106/108; 428/920; 428/921
[58] Field of Search .................. 106/18.11, 18.12, 105, 106/106, 108, 107; 428/688, 689, 697, 699, 702, 704, 920, 921, 537.1, 532

[56] References Cited

U.S. PATENT DOCUMENTS

| | | | |
|---|---|---|---|
| 1,175,427 | 3/1916 | Freeman | 106/108 |
| 2,466,145 | 4/1949 | Austin et al. | 106/106 |
| 2,546,971 | 4/1951 | Byrns | 106/105 |
| 3,320,077 | 5/1967 | Prior | 106/105 |
| 3,853,571 | 12/1974 | Gelbman | 106/105 |
| 3,963,849 | 6/1976 | Thompson | 428/920 |
| 4,066,463 | 1/1978 | Chollet | 428/920 |
| 4,209,339 | 6/1980 | Smith-Johannsen | 106/106 |
| 4,608,087 | 8/1986 | Yoshino et al. | 106/18.12 |

FOREIGN PATENT DOCUMENTS 1143725  3/1985  U.S.S.R. .......................... 106/18.11

*Primary Examiner*—George F. Lesmes
*Assistant Examiner*—James B. Monroe
*Attorney, Agent, or Firm*—Pennie & Edmonds

[57] ABSTRACT

The application concerns a water and fire resistant building material consisting of a layered, shaped and hardened composition of one or more absorbant components, magnesia cement, chemically active fumed silica, alkali silicate, one or several inorganic fillers, one or several lignin sulphonates, eventually ethyl silicate, whereby the final product is built up of a two binder system, one consisting of fumed silica, alkali silicate and possibly magnesium oxide and the other consisting of magnesia cement and a lignin sulphonate salt. The application also concerns the method of producing the product. The procedure is characterized by forming a dual layered binder system and by having a very short press time.

33 Claims, No Drawings

WATER AND FIRE RESISTANT BUILDING MATERIAL

TECHNICAL FIELD

This invention concerns water and fire resistant building materials based on a combination of magnesia cement, one or more absorbant materials, lignin sulphonate, chemically active fumed silica, alkali silicate, water as well as one or more additives. The invention also concerns the method of producing these materials.

BACKGROUND ART

Magnesia or Sorel cement has been known for about 100 years. It has the advantage over Portland cement in that it cures faster and sets harder. On the other hand magnesia cement is slightly water soluble, which results in a reduced water resistance for products made from magnesia cement. However, according to Norwegian Pat. No. NO-PS 151035 its water resistance can be greatly improved by the addition of 0.5–2.0% by weight of ethyl silicate.

Building materials in sheet or strip form made by hot pressing and curing of a mixture consisting mainly of wood fibers, inorganic fillers, finely divided light calcined magnesia (MgO) and an aqueous magnesium chloride solution, and a method for producing them is described in Norwegian Pat. No. NO-PS 141889. Such a building product according to Norwegian Pat. No. NO-PS 141889 is characterized by the cured mixture having:

(a) a weight ratio of MgO to wood fiber of 1:3–1:4,
(b) a weight ratio of $MgCl_2$ to wood fiber material of 1:9–1:12,
(c) an amount of chemically inactive silica of 2–15% based on the wood fiber content and
(d) possibly up to 5%, preferably 2–4% waterglass, based on the wood fiber content.

The procedure according to Norwegian Pat. No. NO-PS 141889 is characterized by 30–40 parts by weight finely divided light calcined magnesia being mixed with 3–4 times its weight of a wood fiber filler which consists mainly of splinters with a length of at the most 20 mm, 2–8 parts by weight of inactive silica, at least one aqueous liquid containing 9–12 parts by weight $MgCl_2$ and 30–60 parts by weight of water, with possibly 1–5 parts waterglass, and where this mixture is formed and cured from 3–20 minutes at a pressure of 15–50 bar and a temperature of 120°–220° C. Production of wood fiber boards according to Norwegian Pat. No. NO-PS 141889 can be continuous by extrusion or piece by piece in a flat press.

Wood fiber boards made according to Norwegian Pat. No. NO-PS 141889 are claimed to be dimensionally stble and "showed, even after long submersion in water no noticeable swelling" (Norwegian Pat. No. NO-PS 141189, page 7, lines 1–4).

DETAILED DESCRIPTION OF THE INVENTION

The present invention concerns a water and fire resistant building material which is characterized by being a shaped and cured structure consisting of a layered combination of one or more absorbant components, magnesia cement, one or more lignin sulphonates, chemically active fumed silica, an alkali silicate, possibly one or more inorganic additives (fillers) and possibly ethyl silicate. The final product therey consists of two binder systems, one consisting of water resistant magnesia cement, lignin sulphonate, preferably magnesium lignin sulphonate, and the other consisting of the reaction product of the chemically active fumed silica, alkali silicate and possibly magnesium oxide.

The invention further concerns the method of producing the above mentioned building material, and is characterized by the layering of one or ore absorbent materials with a dispersion of fumed silica in alkali silicate, possibly with ethyl silicate, and then with magnesium oxide and inorganic fillers, followed by a solution of magnesium salt containing lignin sulphonate in which also may be dispersed inorganic fillers, after which the finished composition is formed and cured under suitable pressure and temperature conditions until the free water in the mixture is bound as hydrate, and the material is shaped and hardened to form the desired building material.

The new and essential feature of this invention is that the final product is built up of a combination of two binder systems. One of them, system A consists of water resistant magnesia cement with a lignin sulphonate salt, while the other, system B, consists of the reaction product of chemically active fumed silica, an alkali silicate and possibly magnesium oxide. By the layered structuring of the final product the two binder systems are separated from one another during the initial stages of curing, at which time they are incompatible with one another, and the curing reactions are assumed to take place independently of one another.

System A gives good early strength and short press time and contributes to high water and fire resistance.

System B develops and increases strength over a longer period of time as well as also having a beneficial effect on both water and fire resistance. In addition the use of the lignin sulphonate in combination with system A increases both strength and water resistance, especially when the absorbant base material consists of wood fibers.

The short press time is of vital importance in a commercial operation. According to this invention the cure time is on the order of 2 minutes at a temperature of between 150°–175° C. In contrast to this the Sorel cement decreased in U.S. Pat. No. 2,466,145 apparently requires much longer cure times. Usual practice with Sorel bonded wood fiber systems requires cure times up to 20 minutes.

An essential feature of the present invention is the layered addition of the reactive components. In contrast to this U.S. Pat. No. 1,175,427 states that it is immaterial how the different ingredients are mixed. The layered concept of the present invention is required because of the nature of the dual binder system.

A preferred embodiment of the procedure according to this invention requires the absorbant component to be covered as much as possible by a continuous layer of a dispersion of fumed silica in alkali silicate (water glass). The layer is rendered insoluble by the following addition of a layer or coating of magnesium oxide. After this the magnesium chloride or sulphate solution is added along with the lignin sulphonate, which may also contain dispersed inorganic filler materials. Under high pressure the absorbant components and binders are consolidated and at elevated temperature the magnesium cement hydrate is formed removing free water from the mix and storing it in the form of crystalline water.

When exposed to high temperature, as in a fire, the alkali silicate in the product expands and helps to shut off the supply of air (oxygen). The magnesia cement also under these conditions, gives off water over a wide temperature range, and in this way acts to limit the temperature and to smother the fire. The lignin sulphonate acts as a bridge between the magnesia cement structure and the cellulose in the wood fiber base material, and has the further advantage that it surprisingly improves the water resistance. Of the inorganic filler addities dolomite is especially attractive because under fire conditions it gives off carbon dioxide gas.

EXAMPLES

The following examples show that a building material made according to this invention has high bending strength and tensile strength little swelling and low water absorbsion under submersion in water, and good fire resistance. The components in the following examples were layered in the indicated order and proportions.

Example 1 (Sample 989-28). Made in laboratory.

| | | |
|---|---|---|
| 1. | Coarse wood fiber | 18.9% |
| 2. | Fine wood fiber | 16.7% |
| 3. | { 29.8% fumed silica dispersed | 5.1% |
|    | { Water glass | 4.7% |
| 4. | Fumed silica ("Micropoz") | 5.6% |
| 5. | Premix containing: | 10.4% |
|    | { 60.6% $MgCl_2.6H_2O$ | |
|    | { 14.7% Lignin sulphonate (Calcium) | |
|    | { 24.7% water | |
| 6. | Dolomite | 5.6% |
| 7. | Recycled surface grindings | 7.0% |
| 8. | Magnesium Oxide | 15.6% |
| 9. | Premix as in 5 | 10.4% |
| | | 100.0% |

Press time: 2.2 minutes
Press temperature: 160/170° C.

Example 2 (Sample 989-14). Made in laboratory

| | | |
|---|---|---|
| 1. | Coarse wood fiber | 20.8% |
| 2. | Fine wood fiber | 18.4% |
| 3. | Water glass | 5.2% |
| 3. | Fumed silica 29.8% dispersion | 4.7% |
| 4. | Dolomite | 6.1% |
| 4. | Fumed silica ("Micropoz") | 6.1% |
| 5. | Magnesium oxide | 17.2% |
| 6. | Premix containing: | 21.5% |
|    | { 60.6% $MgCl_2.6H_2O$ | |
|    | { 14.7% Lignin sulphonate (calcium) | |
|    | { 24.7% water | |
| | | 100.0% |

Press time: 2.2 minutes
Press temperature: 160/170° C.

Example 3 (Sample 989). Full Scale Test.

| | | | |
|---|---|---|---|
| 1. | Coarse wood fiber | 20.4% | ⎫ |
| 2. | Fine wood fiber | 18.2% |   |
| 3. | Magnesium Oxide | 17.4% | Pre- |
| 4. | Dolomite | 6.0% | mixed |
| 5. | Fumed silica ("Micropoz") | 6.0% | ⎭ |
| 6. | Water | 7.2% | ⎫ Pre- |
| 7. | Water glass | 3.7% | ⎭ mixed |
| 8. | Lignin sulphonate | 5.4% | ⎫ Pre- |
| 9. | 33% $MgCl_2$ solution | 15.7% | ⎭ mixed |
| | | 100.0% | |

Press time 2.5 minutes.
Press temperature 163/170° C.

Example 4 (Comparative) (sample 498). Full Scale Test

| | | | |
|---|---|---|---|
| 1. | Coarse wood fiber | 23.3% | ⎫ |
| 2. | Fine wood fiber | 23.3% |   |
| 3. | Water glass | 2.8% | Pre- |
| 4. | Water | 5.5% | mixed |
| 5. | Magnesium Oxide | 20.6% |   |
| 6. | Fumed silica ("Micropoz") | 5.5% | ⎭ |
| 7. | Ethyl Silicate | 0.5% | |
| 8. | 33% $MgCl_2$ Solution | 18.5% | |
| | | 100.0% | |

Press time 3 minutes
Press temperature 120/136° C.

Example 5 (Sample 989-60). Made in laboratory

| | | |
|---|---|---|
| 1. | Coarse wood fiber | 18.7% |
| 2. | Premix containing: | 19.9% |
|    | 25.9% water | |
|    | 7.4% lignin sulphonate (calcium) | |
|    | 30.3% $MgCl_2.6H_2O$ | |
|    | 36.4% Fumed silica ("Micropoz") | |
| 3. | Fine wood fiber | 16.5% |
| 4. | Recycled surface grindings | 6.1% |
| 5. | Magnesium oxide | 15.4% |
| 6. | Premix as in 2 | 19.9% |
| 7. | Water glass | 3.5% |
| | | 100.0% |

Press time: 2.2 minutes.
Press temperature 170/170° C.

The completely cured building panels were then tested for the following properties:
Bending strength
Transverse Tensile Strength
Percent swelling and water absorption in water after 2 and 24 hours submersion in water. The panels were further tested for fire resistance according to Norwegian procedure NS 3903 and NT Fire 004.

Reference is made to the curves for combustion gas temperature and smoke density which were carried out at the Laboratory for Investigation of Fire Technology (Brannteknisk Lab.) SINTEF in Trondheim.

| | Test Results | | | | |
|---|---|---|---|---|---|
| Example no. | 1 | 2 | 3 | 4 | 5 |
| Bending strength, MPa Average of 5 samples | 9.0 | 11.5 | 12.5 | 8.1 | 10.4 |
| Transverse Tensile Strength, MPa Average of 5 samples | 0.51 | 0.54 | 0.52 | 0.45 | 0.51 |
| Swelling in water % after 2 hours average 3 samples | 2.0 | 5.2 | 3.9 | 4.7 | 4.1 |
| Swelling in water % after 24 hours average 3 samples | 7.1 | 11.7 | 12.6 | 12.7 | 10.8 |
| Water absorption % after 2 hours average 3 samples | 9.0 | 16.0 | 16.0 | 14.1 | 9.7 |
| Water absoption % after 24 hours average of 3 samples | 23.7 | 32.0 | 33.0 | 34.2 | 26.4 |
| Fire test: NS3903 and NT Fire 004 Limit: K1/IN1 Under Limit curve 1 | Yes | Yes | Yes | Yes | Yes |

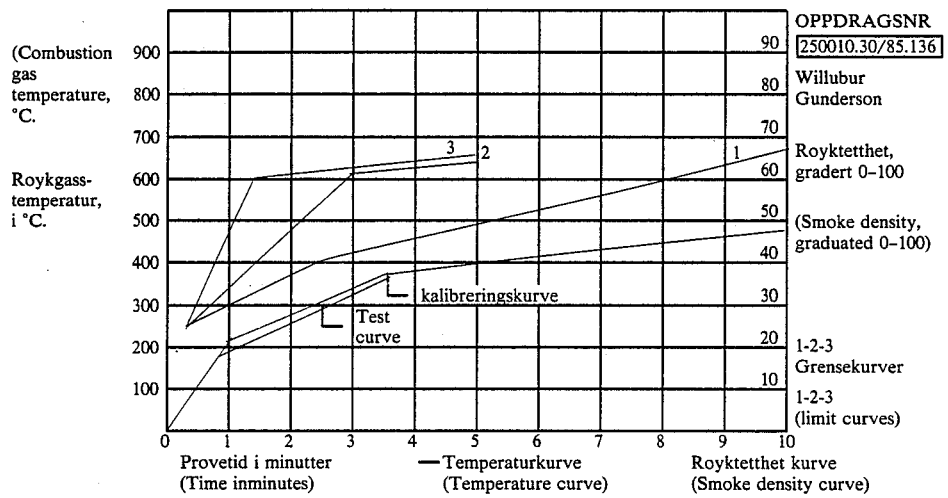

We claim:

1. Water and fire resistant building material characterized by a composition built up in individual layers and then shaped and hardened said layers each including at least one component selected from the group consisting of an absorbent component, magnesia cement, one or more lignin sulfonate, and chemically active fumed silica, and an alkali silicate being present in at least one layer, whereby after hardening, the final composition includes two binder systems, one consisting of said water resistant magnesia cement and lignin sulfonate, and the other consisting of the reaction product between said chemically reactive fumed silica, magnesium oxide and alkali silicate.

2. The material of claim 1 which further includes ethyl silicate or one or more inorganic filler additives.

3. The material of claim 1 which further includes magnesium chloride or magnesium sulfate.

4. The material of claim 3 wherein the magnesium chloride or magnesium sulfate is present in an amount between 5 and 13 percent.

5. The material of claim 1 wherein the absorbent material is present in an amount of between 10 and 70 percent, the magnesia cement is present in an amount of between 10 and 70 percent, the lignin sulphonate is present in an amount of between 0.1 and 15 percent, the fumed silica is present in an amount of between 1 and 15 percent, and the alkali silicate, if used, is present in an amount of between 1 and 25 percent, all percents calculated on the total weight of the building material.

6. The material of claim 5 which further includes magnesium chloride or magnesium sulfate.

7. The material of claim 6 wherein the magnesium chloride or magnesium sulfate is present in an amount between about 5 and 13 percent.

8. A water and fire resistant building material prepared from a plurality of individual layers and comprising an absorbent material and at least two binder systems, including a first binder system comprising magnesia cement, at least one lignin sulfonate, and magnesium chloride or magnesium sulfate; and a second binder system comprising the reaction product of magnesia cement, chemically active fumed silica and an alkali silicate, wherein said first and second binder systems cure independently of each other; wherein each of said layers includes at least one of said components of the binder systems.

9. The material of claim 8 wherein the magnesium chloride or magnesium sulfate is present in an amount between about 5 and 13 percent.

10. The material of claim 8 which further includes an absorbent material.

11. The material of claim 10 wherein the absorbent material is present in an amount of between 10 and 70 percent, the magnesia cement is present in an amount of between 10 and 70 percent, the lignin sulfonate salt is present in an amount of between 0.1 and 15 percent, the fumed silica is present in an amount of between 1 and 15 percent, and the alkali silicate is present in an amount of between 1 and 25 percent, all percents calculated on the total weight of the building material.

12. The material of claim 10 wherein the absorbent material is cellulose fiber, wood fiber, perlite, fly ash, mineral wool, glass wool, diatomaceous earth, or mixtures thereof.

13. The material of claim 8 which further includes ethyl silicate in an amount of up to about 5 percent by weight of the material.

14. The material of claim 8 which further includes an organic filler additive in an amount of up to about 30 percent of the material.

15. The material of claim 14 wherein the filler is dolomite, feldspar or mixtures thereof.

16. The material of claim 8 wherein the magnesia cement comprises magnesium oxychloride hydrate, magnesium oxysulfate hydrate, magnesium oxide, or mixtures thereof.

17. The material of claim 8 wherein the alkali silicate compound is sodium silicate water glass, potassium silicate water glass, or mixtures thereof.

18. The material of claim 8 wherein the lignin sulfonate salt is a calcium, magnesium or alkali metal lignin sulfonate salt, or mixtures thereof.

19. A water and fire resistant building material prepared from a plurality of individual layers which are built up, then shaped and hardened, comprising a first binder comprising magnesia cement, at least one lignin sulfonate salt, and magnesium chloride or magnesium sulfate; and a second binder system comprising the reaction product of magnesium oxide, chemically active fumed silica; and an alkali silicate; wherein said building material includes an absorbent material in an amount of between 10 and 70 percent; with the magnesia cement present in an amount of between 10 and 70 percent, the lignin sulfonate salt being present in an amount of between 0.1 and 15 percent, the magnesium chloride or sulfate being present in an amount of between about 5.181 and 13 percent, the fumed silica being present in an amount of between 1 and 15 percent, and the alkali silicate being present in an amount of between 1 and 25 percent, all percents calculated on the total weight of the building material; wherein each of said layers includes said absorbent material or at least one of said components of the binder systems.

20. The material of claim 19 which further includes ethyl silicate in an amount of up to about 5 percent by weight of the material.

21. The material of claim 19 which furth3er includes an organic filler additive in an amount of up to about 30 percent of the material.

22. The material of claim 19 wherein the magnesia cement comprises magnesium oxychloride hydrate, magnesium oxysulfate hydrate, magnesium oxide, or mixtures thereof.

23. The material of claim 19 wherein the alkali silicate compound is sodium silicate water glass, potassium silicate water glass, or mixtures thereof.

24. The material of claim 19 wherein the absorbent material is cellulose fiber, wood fiber, perlite, fly ash, mineral wool, diatomaceous earth, or mixtures thereof.

25. The material of claim 19 wherein the lignin sulfonate salt is a calcium, magnesium or alkali metal lignin sulfonate salt, or mixtures thereof.

26. The material of claim 19 wherein the filler is dolomite, feldspar or mixtures thereof.

27. A water and fire resistant building material consisiting essentially of an absorbent material in an amount of between 10 and 70 percent; magnesia cement in an amount of between about 10 and 70 percent; at least one lignin sulfonate salt in an amount of between about 0.1 and 15 percent; and fumed silica in an amount of between about 1 and 25 percent, all percents calculated on the total weight of the building material.

28. The material of claim 27 which further includes ethyl silicate in an amount of up to about 5 percent by weight of the material.

29. The material of claim 27 which further includes an organic filler additive in an amount of up to about 30 percent of the material.

30. The material of claim 27 which further includes up to 25 percent of an alkali silicate.

31. The material of claim 27 wherein a first portion of the magnesia cement and lignin sulfonate salt form a first binder system and a second portion of the magnesia cement and the fumed silica form a second binder system.

32. The material of claim 27 which further includes magnesium chloride or magnesium sulfate.

33. The material of claim 27 wherein the magnesium chloride or magnesium sulfate is present in an amount between about 5 and 13 percent.

* * * * *